United States Patent
Doyen et al.

(10) Patent No.: US 11,253,909 B2
(45) Date of Patent: Feb. 22, 2022

(54) METHOD OF AND DEVICE FOR INSTALLING A COMPONENT IN A BORE

(71) Applicant: The Lee Company, Westbrook, CT (US)

(72) Inventors: Serge Doyen, Essex, CT (US); Damian Bianchi, Durham, CT (US); Joseph Riccitelli, Deep River, CT (US); Dave Courcy, Essex, CT (US)

(73) Assignee: THE LEE COMPANY, Westbrook, CT (US)

( * ) Notice: Subject to any disclaimer, the term of this patent is extended or adjusted under 35 U.S.C. 154(b) by 755 days.

(21) Appl. No.: 15/901,007

(22) Filed: Feb. 21, 2018

(65) Prior Publication Data
US 2018/0243816 A1   Aug. 30, 2018

Related U.S. Application Data

(60) Provisional application No. 62/600,744, filed on Feb. 28, 2017.

(51) Int. Cl.
| | |
|---|---|
| *B21J 15/14* | (2006.01) |
| *B21K 25/00* | (2006.01) |
| *B25B 27/24* | (2006.01) |
| *F16K 27/00* | (2006.01) |

(52) U.S. Cl.
CPC ............. *B21J 15/14* (2013.01); *B21K 25/00* (2013.01); *B25B 27/24* (2013.01); *F16K 27/003* (2013.01)

(58) Field of Classification Search
CPC ........ B21J 15/14; B21K 25/00; B23P 19/084; B25B 27/24; F15B 13/0807; F16K 27/003

USPC .......................................................... 29/606
See application file for complete search history.

(56) References Cited

U.S. PATENT DOCUMENTS

| | | | | |
|---|---|---|---|---|
| 3,068,559 A | * | 12/1962 | Gonld | F16L 55/00 29/213.1 |
| 3,314,136 A | * | 4/1967 | Giles | B25B 27/24 29/249 |
| 3,315,339 A | * | 4/1967 | Young | F01L 3/10 29/249 |
| 3,377,691 A | * | 4/1968 | Kasper | B23P 19/045 29/797 |
| 3,793,999 A | * | 2/1974 | Seiler | B23P 19/045 123/90.67 |

(Continued)

FOREIGN PATENT DOCUMENTS

DE   10053257 A1 * 5/2002 ............. B25B 27/24

*Primary Examiner* — Joseph J Hail
*Assistant Examiner* — Arman Milanian
(74) *Attorney, Agent, or Firm* — Cantor Colburn LLP

(57) ABSTRACT

An installation tool for installing an insert into a bore having a bore material, the insert having a fluid component disposed within a housing, the installation tool including: an outer tool member and an inner tool member, the inner tool member being concentric with, smaller in diameter than, and slidingly engaged within the outer tool member, the inner tool member being configured to axially drive the insert into the bore; wherein an upper end of the outer tool member forms and defines a blind cavity between the inner tool member at one end of the blind cavity and a cavity end wall at an opposing end of the blind cavity; wherein a resilient biasing member is disposed within the blind cavity, the resilient biasing member being configured to provide an axial load on the inner tool member.

24 Claims, 19 Drawing Sheets

(56) References Cited

U.S. PATENT DOCUMENTS

| | | | | |
|---|---|---|---|---|
| 3,995,360 | A | * | 12/1976 | Millheiser ............... B25B 27/20 |
| | | | | 29/229 |
| 5,761,785 | A | * | 6/1998 | Connolly ............. B23P 19/045 |
| | | | | 269/21 |
| 5,915,740 | A | * | 6/1999 | Weitner ................ B23P 19/045 |
| | | | | 29/213.1 |
| 6,256,852 | B1 | * | 7/2001 | Decker ................... B25B 27/06 |
| | | | | 29/229 |
| 2006/0284130 | A1 | * | 12/2006 | Cripps ................ F16K 31/0655 |
| | | | | 251/129.15 |
| 2008/0247844 | A1 | * | 10/2008 | Hartrampf ............... B21J 15/14 |
| | | | | 414/4 |
| 2016/0067854 | A1 | * | 3/2016 | Moore ................... B25B 27/26 |
| | | | | 29/214 |
| 2016/0339506 | A1 | * | 11/2016 | Blacket ............... B23K 20/227 |

* cited by examiner

METHOD OF AND DEVICE FOR INSTALLING A COMPONENT IN A BORE

CROSS REFERENCE TO RELATED APPLICATIONS

This application claims the benefit of U.S. Provisional Application Ser. No. 62/600,744, filed Feb. 28, 2017, which is incorporated herein by reference in its entirety.

BACKGROUND OF THE INVENTION

The present invention relates generally to the installation of fluid system components, and more particularly to a method of installing a fluid system component within a bore formed in a boss or manifold, and a device for carrying out said method.

A variety of fluid systems require the insertion of flow control components, such as valves, restrictors, screens or filters or the like within a bore or passage formed in a boss or manifold, or within a tubing, a fitting, or a hose end, with the retention of the component, and a seal between the component and the bore is desirable. Conventional installation methods include cementing, welding, or screwing the component in place. Distorting the installation bore by swaging or staking can be a convenient and quick method, although these methods generally require use of significant force, particularly when the material to be distorted is metal and not easily malleable. The application of sufficient force to cause desired flow of the bore material to adequately retain the component can make the formation of an adequate seal difficult. Excessive force transmitted to the seal frequently causes an imperfect seal. It is further noted that transmittal of force to critical areas of the fluid component may distort critical dimensions of the component and alter or degrade the performance of the component. Therefore the art of component installation would be improved with a method of installation that results in both secure retention and adequate sealing of the component within the bore without distorting the component, and a device for carrying out the method.

BRIEF DESCRIPTION OF THE INVENTION

An embodiment includes an installation tool for installing an insert into a bore having a bore material, the insert having a fluid component disposed within a housing, the installation tool including: an outer tool member and an inner tool member, the inner tool member being concentric with, smaller in diameter than, and slidingly engaged within the outer tool member, the inner tool member being configured to axially drive the insert into the bore; wherein an upper end of the outer tool member forms and defines a blind cavity between the inner tool member at one end of the blind cavity and a cavity end wall at an opposing end of the blind cavity; wherein a resilient biasing member is disposed within the blind cavity, the resilient biasing member being configured to provide an axial load on the inner tool member.

Another embodiment includes a method of installing an insert into a bore having a bore material, the insert having a fluid component disposed within a housing, the method including: providing a boss or manifold having the bore; providing an installation tool with the insert disposed at a lower end of the installation tool, the installation tool including: an outer tool member and an inner tool member, the inner tool member being concentric with, smaller in diameter than, and slidingly engaged within the outer tool member, the inner tool member being configured to axially drive the insert into the bore; wherein the outer tool member forms and defines a blind cavity between the inner tool member at one end of the blind cavity and a cavity end wall at an opposing end of the blind cavity; wherein a resilient biasing member is disposed within the blind cavity, the resilient biasing member being configured to provide an axial load on the inner tool member; inserting the installation tool and insert into the bore with an axial force that follows a first load characteristic until the insert is first seated on a shoulder of the bore; further inserting the installation tool into the bore with an axial force that follows a second load characteristic that is greater than the first load characteristic, the further inserting being stopped in response to a defined force having been achieved wherein deformation of the bore material has occurred over a portion of the insert resulting in securely staking of the insert in the bore.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Figure 1A:
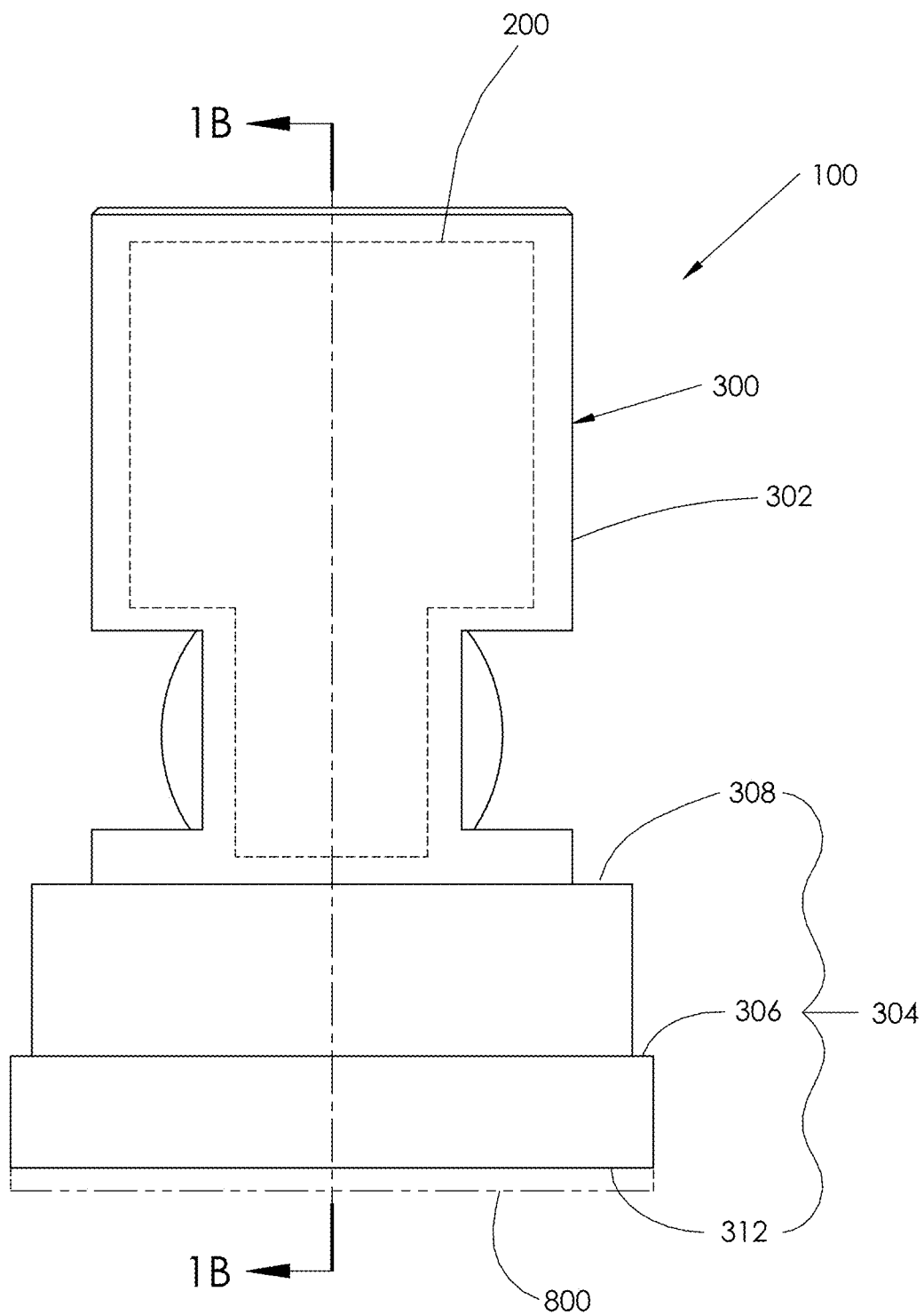
FIG. 1A depicts a side view of an example insert having an example housing and an example fluid component (the fluid component depicted in dashed lines) disposed within the housing, prior to the insert being staked in an installation bore, in accordance with an embodiment.
Figure 1B:
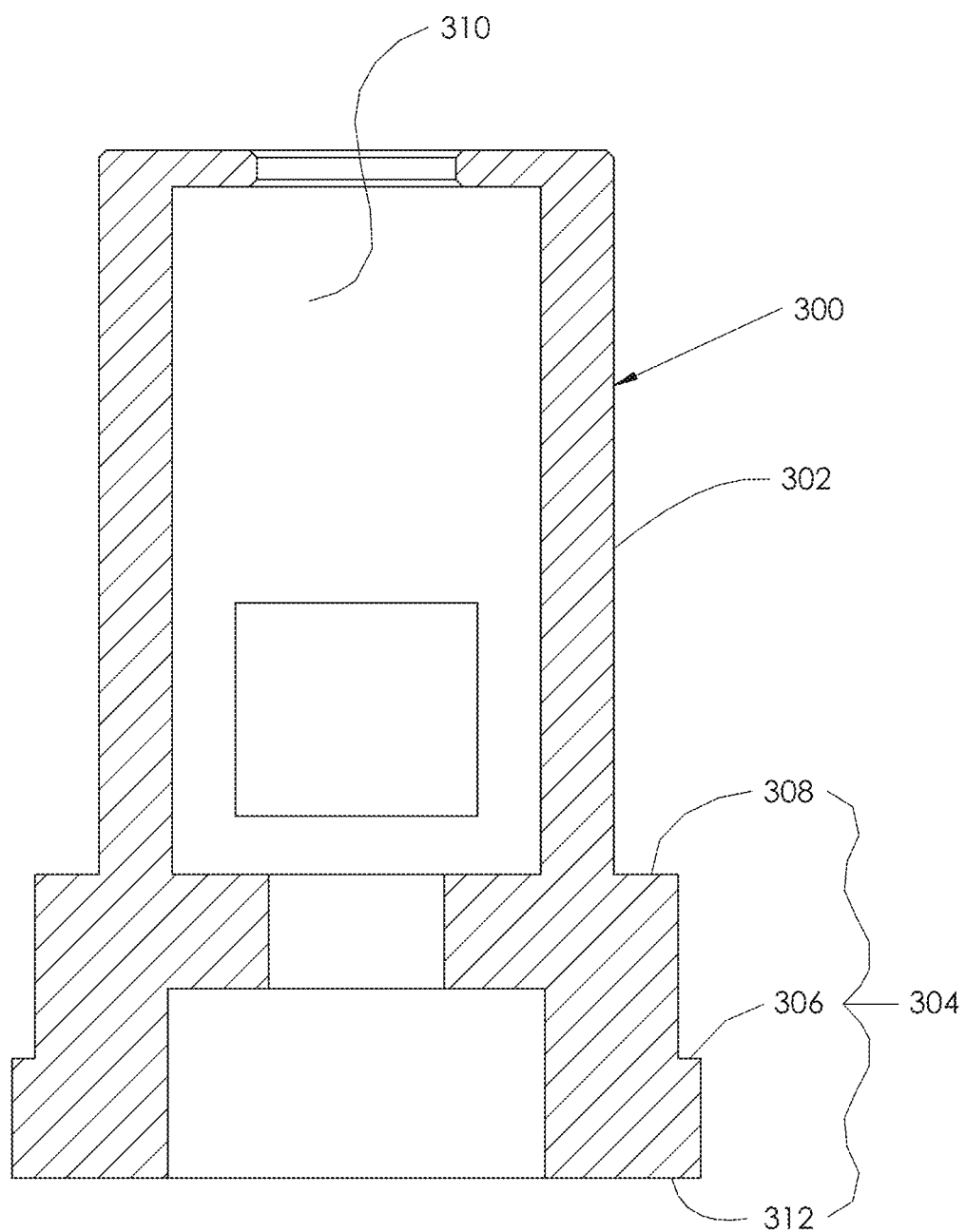
FIG. 1B depicts a side cross section view of the housing (absent the fluid component) of FIG. 1A taken along section cut line 1B-1B, in accordance with an embodiment.

An embodiment as disclosed herein includes a method of securely and sealingly installing a fluid system component, which may include a flow control device, within an installation bore, and an installation and staking tool for accomplishing the method. For ease of reference and clarity, the component is described as being inserted downward into a bore and the terms "downward" or "down" or the like refer to the direction of insertion for installation, while the terms "upward" or "upper" refer to the opposite direction. However, it will be appreciated that such terms are for reference purposes only and are not limiting to the scope of the invention disclosed herein, which may apply to component installations that are upward, sideways, or at an angle relative to a vertical or horizontal axis.

An embodiment as disclosed herein includes a co-axial tool staking having an inner member concentric to an outer member. The inner member has a resilient biasing means so that the inner member can first hold and then seal an insert in a bore. As the installation process continues, the inner member continues holding the insert in place while the outside member loads and stakes the housing of the bore over a portion of the insert. The inner member provides this limited holding as well as a sealing load, where the sealing load is relatively independent of the load being applied by the outer member to the bore. With this configuration both the inner member and the outer member can provide their loads independent of each other. In an embodiment, the inner member positions and holds the insert prior to the dual sealing and staking process.

With reference to FIGS. 1A-1B, 2A-2G, 3-5 and 6A-6C in combination, an embodiment of a staking tool and method of using the same, as disclosed herein, comprises an insert 100, which comprises the combination of a selected fluid component 200 and a housing 300, within which housing 300 the fluid component 200 is secured. The component housing 300 may be adapted in a variety of shapes and configurations provided that the interior of the housing 300 is adapted to accept the fluid component 200, and that the housing 300 comprises a generally cylindrical body 302 with a radially projecting annular flange 304.

Figure 2A:
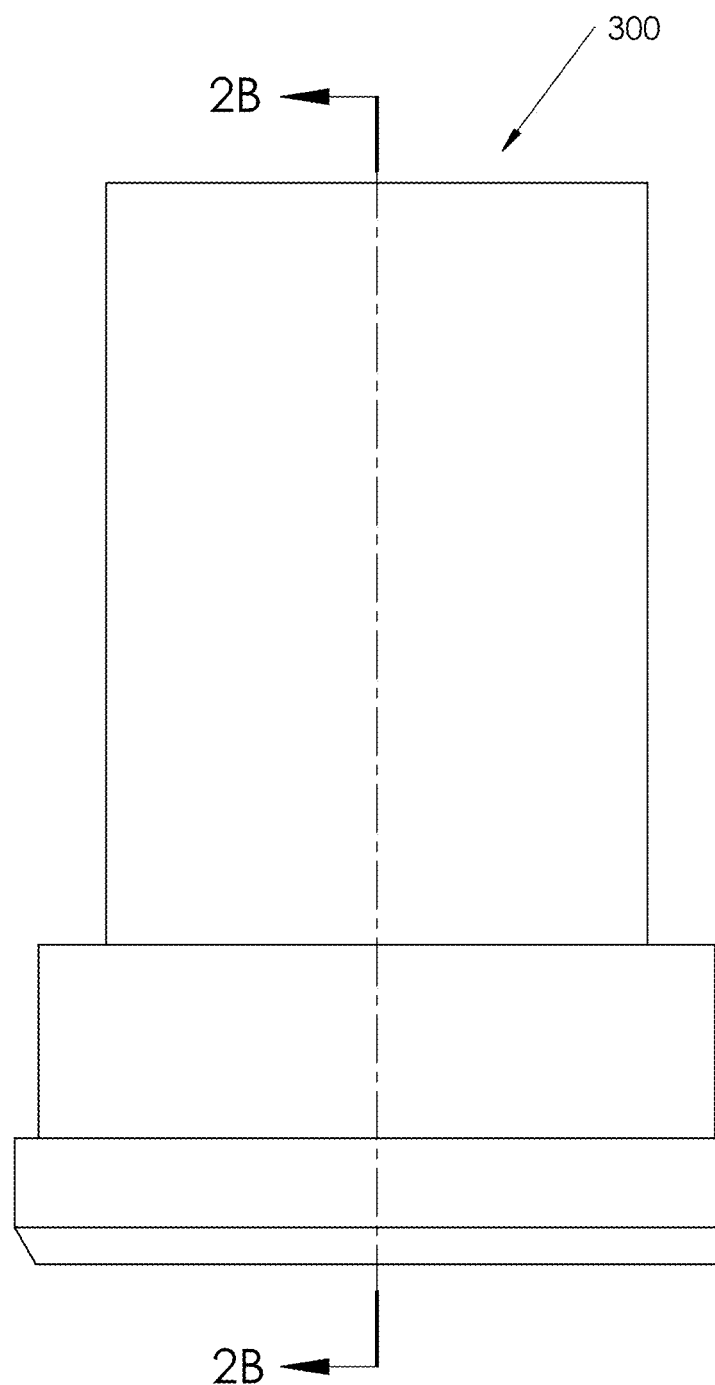
FIGS. 2A and 2B depict an alternative housing to that depicted in FIGS. 1A and 1B, respectively, with FIG. 2B taken along section cut line 2B-2B, in accordance with an embodiment.
Figure 2B:
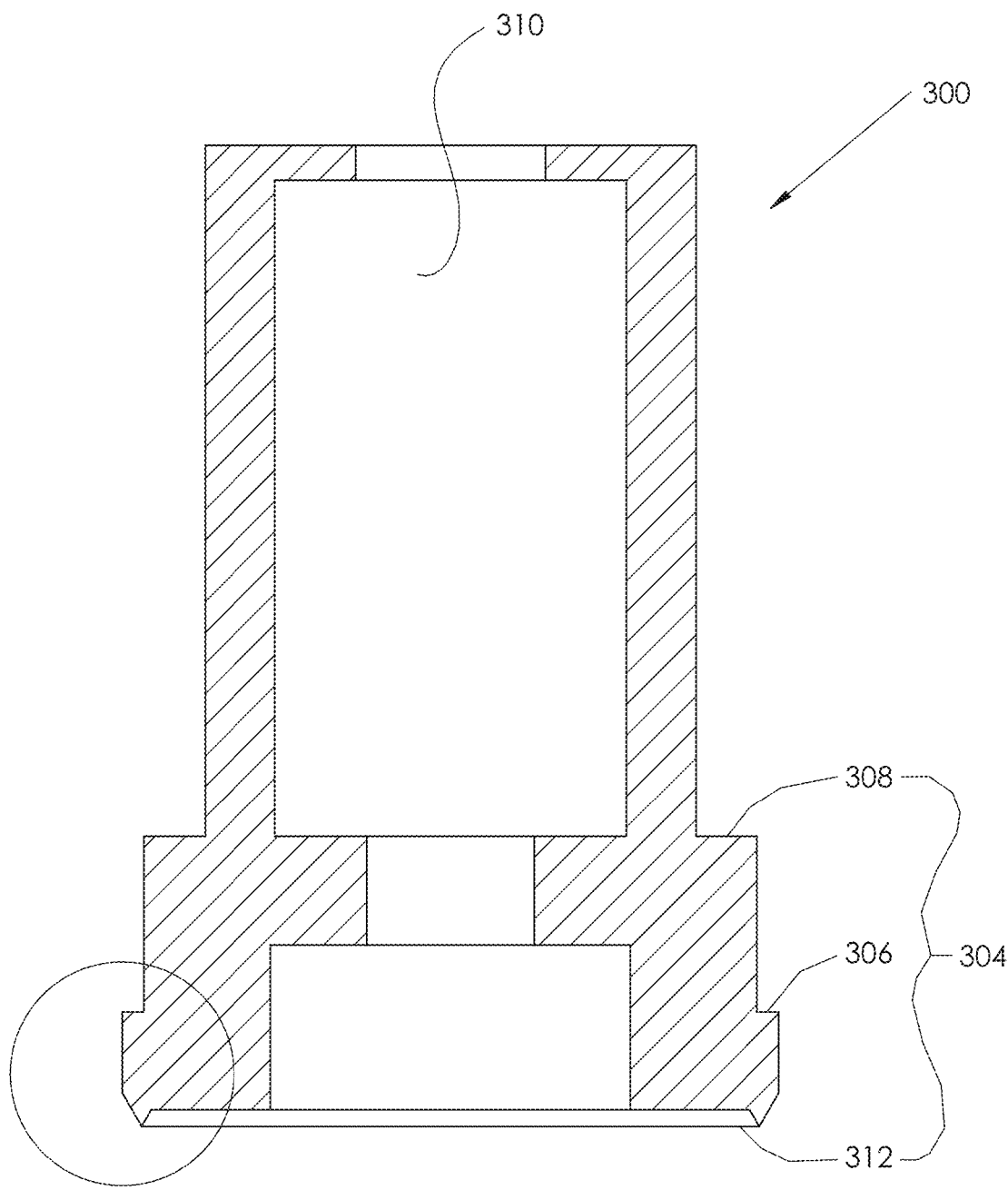
Figure 2C:
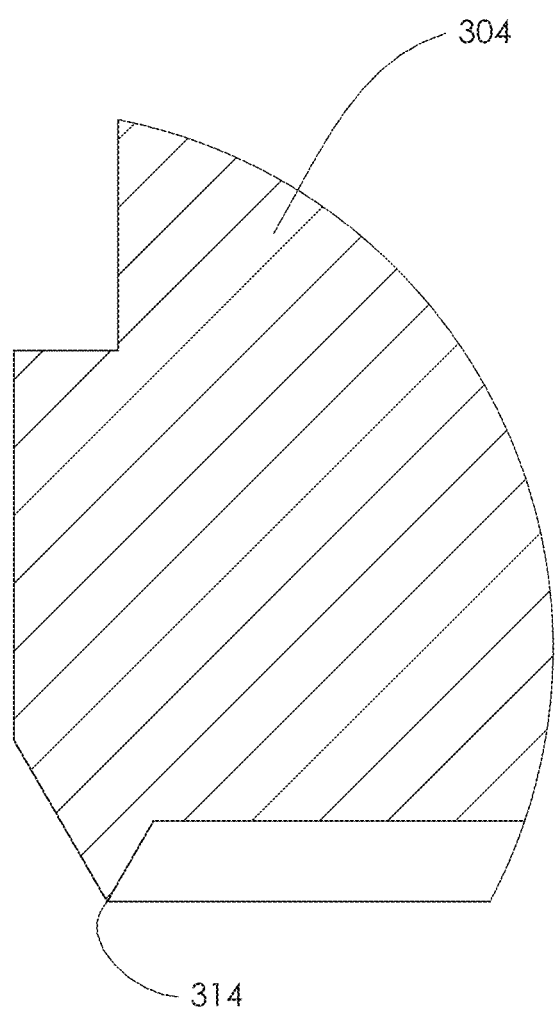
FIGS. 2C, 2D, 2E, 2F and 2G, depict alternative respective sealing Details-2C, 2D, 2E, 2F and 2G, of the housing of FIGS. 2A and 2B, in accordance with an embodiment.
Figure 2D:
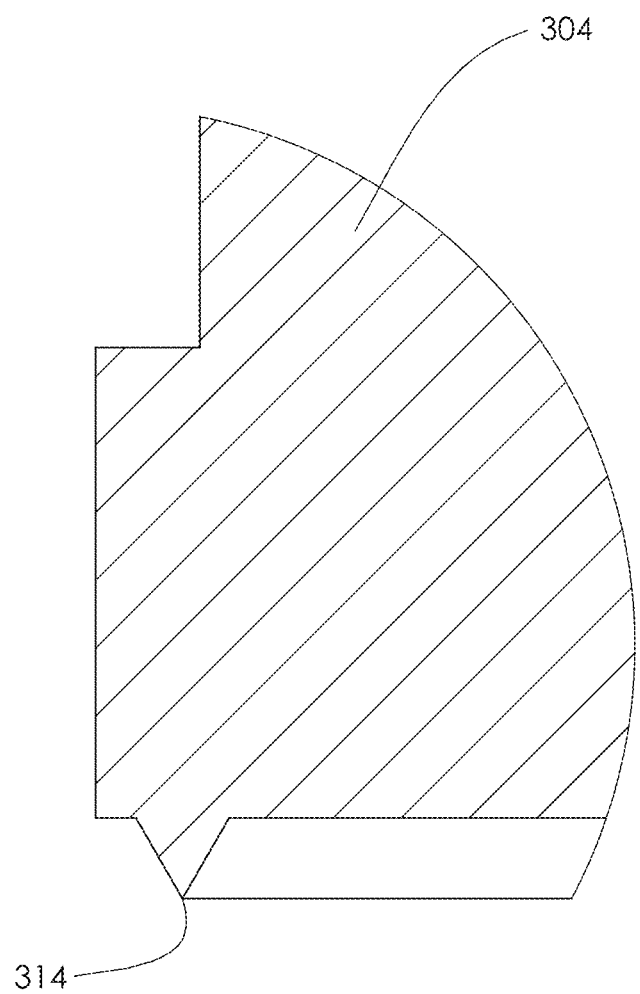
Figure 2E:
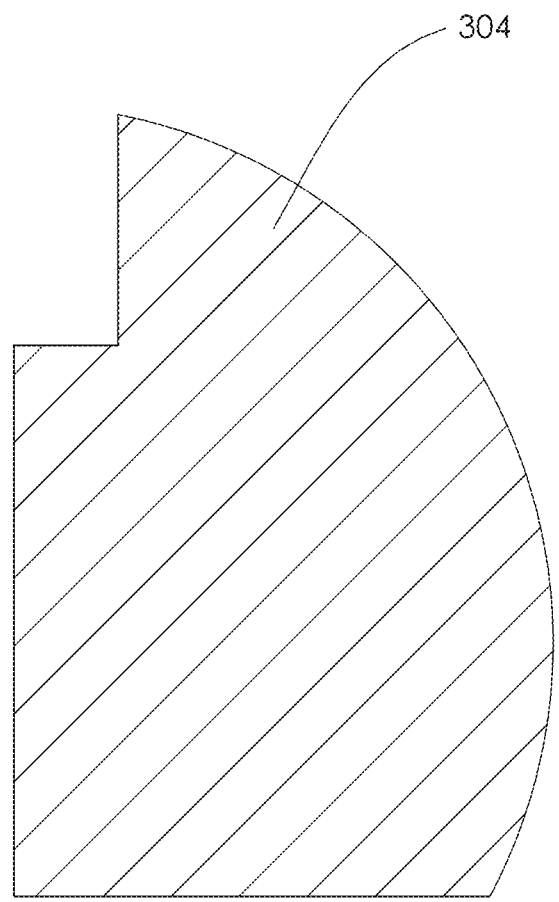
Figure 2F:
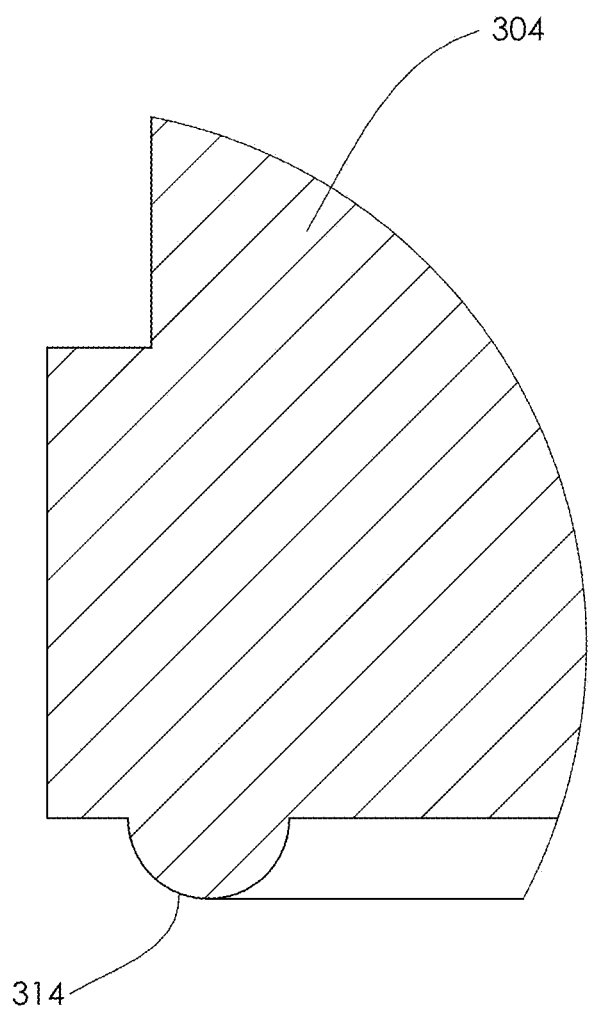
Figure 2G:
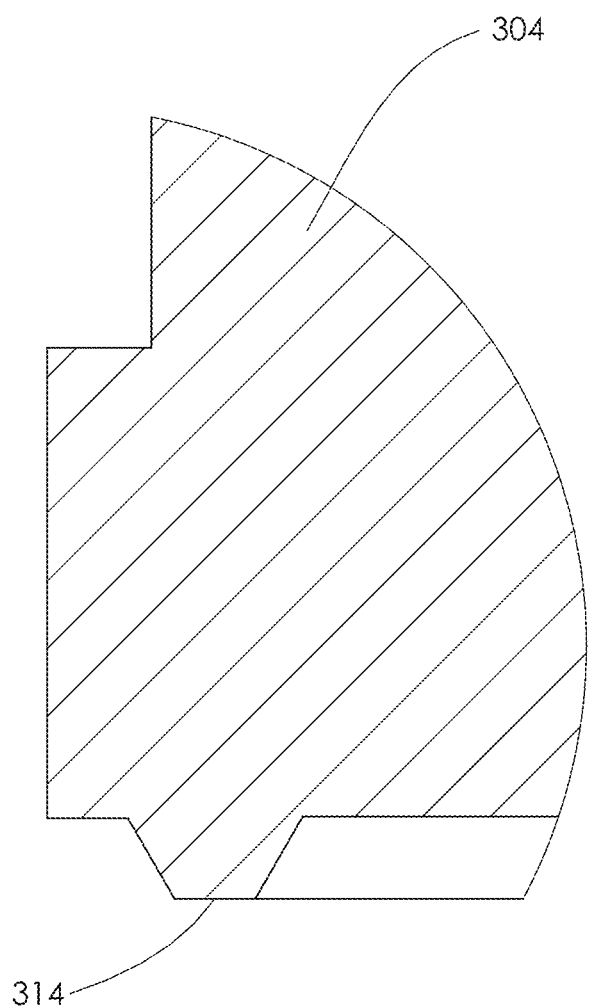
Figure 3:
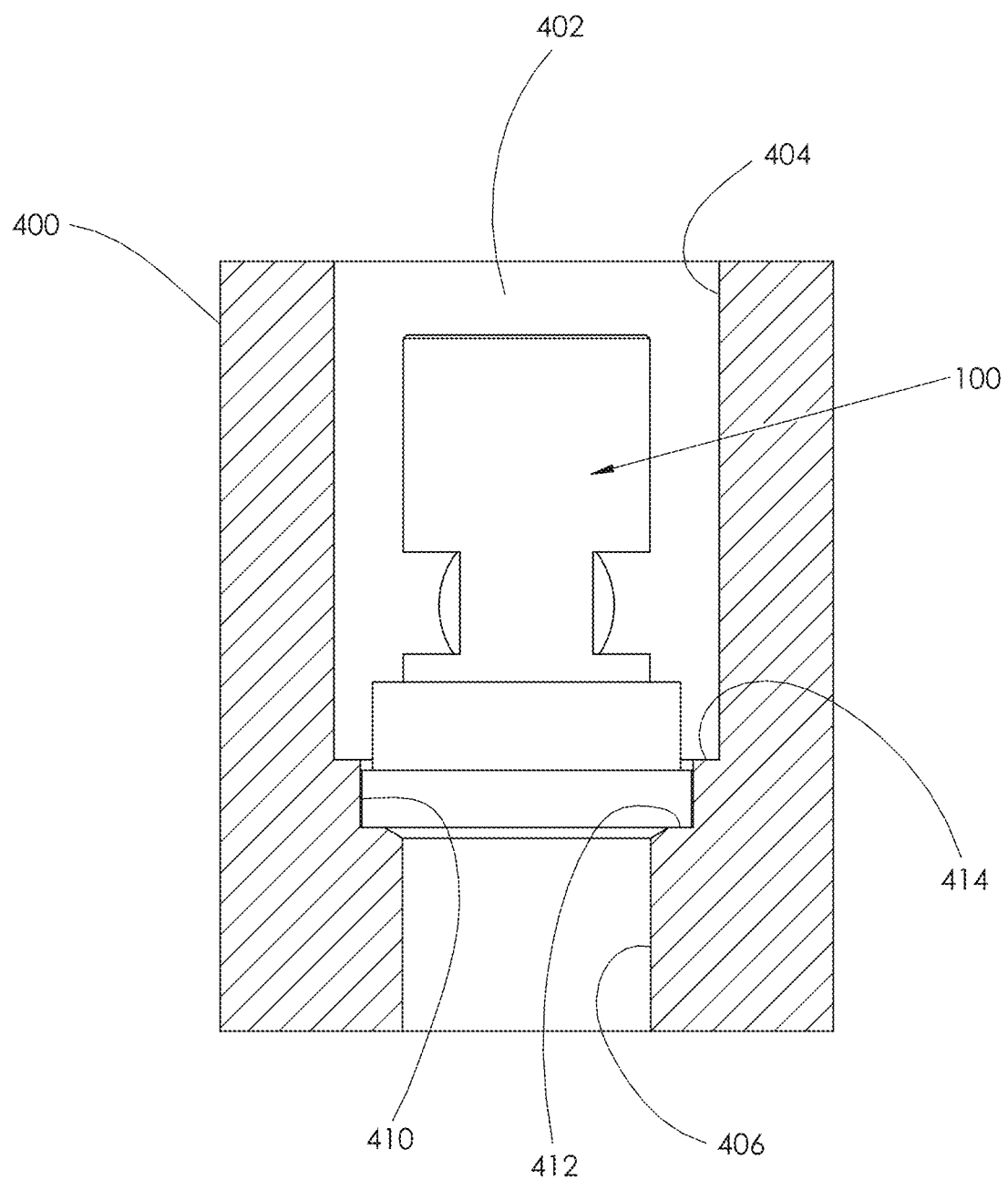
FIG. 3 depicts a side view of the insert of FIG. 1A disposed in an example installation bore of an example boss or manifold (depicted in section view) but not staked in the installation bore, in accordance with an embodiment.

The radially outer edge of the component housing flange 304 is stepped to form a first, lower, upwardly facing annular shoulder 306, and a second, upper, concentric and smaller diameter upward facing shoulder 308. The fluid component housing 300 is formed to comprise a central opening 310 (best seen with reference to FIGS. 1B and 2B), which exposes the fluid component 200 to a fluid media within the installation bore 402 of a boss or manifold 400 (best seen with reference to FIGS. 3 and 4), the housing body central opening 310 being surrounded by the lower, downwardly facing shoulder 312 formed by the flange 304. By reference to a boss or manifold 400 as used herein, it will be appreciated that such reference extends to other housing structures, such as a tubing (thin walled or otherwise), a fitting, or a hose end, as noted above. As such, any reference to a boss or manifold should be broadly interpreted. The radially outer rim of the downward facing flange shoulder 312 optionally may be formed with an annular downwardly projecting sealing ridge 314 (best seen with reference to FIGS. 2C, 2D, 2F and 2G). The annular downwardly projecting sealing ridge 314 depicted in FIG. 2C is formed by a pointed ridge that originates from and extends down from the outer diameter of the flange 304, as compared to the annular downwardly projecting sealing ridge 314 depicted in FIG. 2D that is formed by a pointed ridge that originates from a location inboard of the outer diameter of the flange 304 and then extends down from the inboard location. FIG. 2E depicts a flange 304 absent the optional annular downwardly projecting sealing ridge. FIGS. 2F and 2G depict alternative cross section shapes for the optional annular downwardly projecting sealing ridge 314 (discussed further below).

Generally regarding the optional sealing ridge 314, it will be appreciated that depending on the material selection for the housing 300 and the manifold 400, the sealing ridge 314 itself may upon installation deform where the material of the housing 300 is more malleable than the material of the manifold 400 thereby producing a metallic o-ring seal, or the sealing ridge 314 may upon installation dig into and deform the material of the manifold 400 where the material of the manifold is more malleable than the material of the housing 300. Any and all such alternative arrangements are contemplated and considered to fall within the ambit of the invention disclosed herein. Further generally regarding the optional sealing ridge 314, while an embodiment is depicted and described herein with the ridge 314 having a triangular cross section shape in the form of a pointed tooth, see FIGS. 2C and 2D for example, it will be appreciated that such depiction is for illustration purposes only and that the scope of the invention is not so limited. For example, the ridge 314 may have a cross section in the form of a downwardly projecting dome shape, see FIG. 2F, or a cross section in the form of a downwardly projecting truncated triangular shape, see FIG. 2G, or any other shape suitable for a purpose disclosed herein. Alternative to the optional sealing ridge 314, it is contemplated that a compressible washer 800 (depicted generally in dashed line form in FIG. 1A), such as an elastomer, may be disposed between the bottom of the insert 100 and the lower bore shoulder 412 of the boss or manifold 400, which could be used with the insert detail depicted in FIG. 2E (i.e., absent the ridge 314), where the compressible washer 800 would be more malleable than either the insert 100 or the manifold 400.

The combination of the fluid system component 200 and housing 300 is referenced to herein as the insert 100. An embodiment of a method as disclosed herein generally comprises the formation of the installation bore 402 as described herein, the placement of the insert 100 in to the installation bore 402, followed by the application of a force F by means of a staking tool 500 (best seen with reference to FIGS. 4A and 4B), described below.

The installation bore 402 may be pre-formed as described herein, or the installation method may comprise the adaptation of an existing bore 402 as described herein. In an embodiment an installation bore 402 comprises an opening and an inner wall 404, expected to be cylindrical. However, it will be appreciated that the scope of the invention disclosed herein is not limited to a cylindrical bore 402, a housing 300 having a generally cylindrical body 302, and an installation/staking tool 500 configured to cooperate with such cylindrical structures, as other shaped structures are contemplated and considered to fall within the ambit of the appended claims. With respect to the housing 300, it will be appreciated that the installation of different fluid components 200 will drive the needed configuration of the housing 300. For example, if the fluid component 200 were to consist of only an orifice or a screen, then the cylindrical body 302 may be eliminated, and the housing 300 may consist primarily of the flange 304 with an appropriately sized orifice or screen at the level of the upward facing shoulder 308. The inner wall 404 of the installation bore 402 is formed in a stepped diameter fashion with a first smaller diameter bore section 406 being farthest down the bore 402 from the bore opening (upper side of boss or manifold 400, best seen with reference to FIG. 4A), a second, largest diameter bore section 408 being uppermost in the bore 402 toward and including the bore opening, and an intermediate diameter bore section 410 in an intermediate position axially disposed between the uppermost, largest bore section 408 and the smallest bore section 406. The stepped inner bore wall 404 thereby forms two upward facing shoulders, the first, lower bore shoulder 412 having a smaller diameter than the second, upper bore shoulder 414. The intermediate bore section 410 and the housing flange 304 are sized to allow the component housing flange 304 to be slidingly fit within the intermediate bore section 410 with the optional downward projecting sealing ridge 314 of the downward facing flange shoulder 312 engaging the upward facing surface of the first bore shoulder 412, and the upward facing flange shoulder 306 is positioned slightly below the surface of the second, larger bore shoulder 414. The axial separation of the upward facing flange shoulder 306 from the second bore shoulder 414 is less than the axially downward projection of the optional flange sealing ridge 314. It will be appreciated that the bore material should be significantly more malleable than the material of the component housing and staking tool. In an embodiment, the installation bore 402 is formed in an aluminum alloy, and the housing 300 and staking tool 500 are formed of a harder metal, such as steel for example. That said, other materials suitable for a purpose disclosed herein are contemplated and considered fall within the scope of the invention disclosed herein. For example, it will be appreciated that one skilled in the art may select materials for the manifold 400, housing 300, and staking tool 500, according to the following: the manifold 400 being the softest (aluminum for example), the staking tool 500 being the hardest to prevent wear and distortion over repeated uses (hardened steel or stainless steel, for example), and the housing 300 being of an intermediate hardness (brass or non-hardened steel for example). However, it will be further appreciated that customer needs may require the housing 300 to be made from hardened steel or stainless steel. Any and all such variations of materials is contemplated and considered to fall within the ambit of the invention disclosed herein. With respect to material selection, it will be appreciated that a ridge material selected to be softer than a manifold material will tend to result in the ridge material collapsing and expanding against the manifold material to create the desired seal, while a ridge material selected to be harder than a manifold material will tend to result in the ridge material digging into the manifold material to create the desired seal.

Figure 4A:
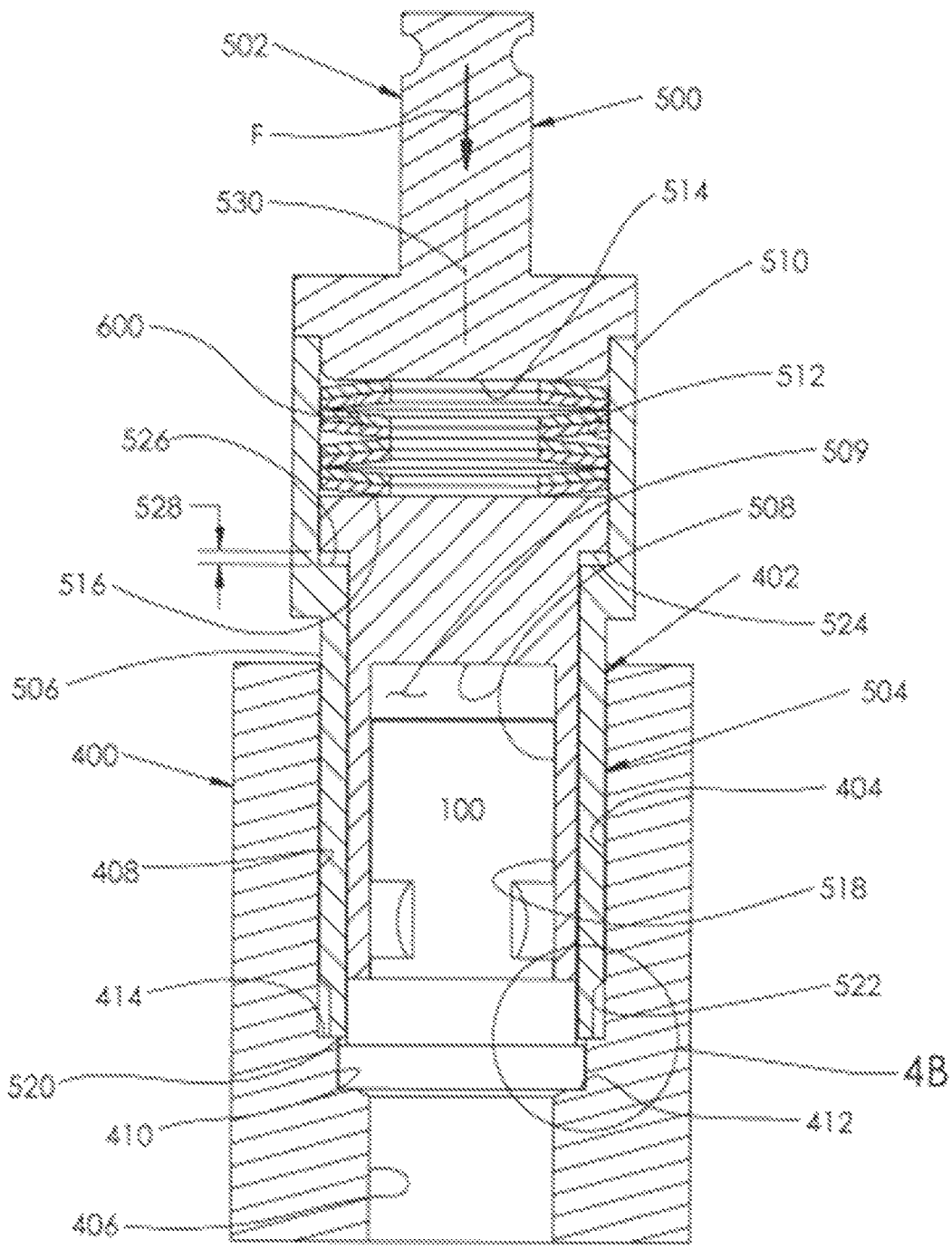
FIG. 4A depicts a side view of the insert of FIG. 1A partially inserted into but not staked in an installation bore according to a method in accordance with an embodiment, with a cross sectional view of a staking tool formed in accordance with an embodiment.
Figure 4B:
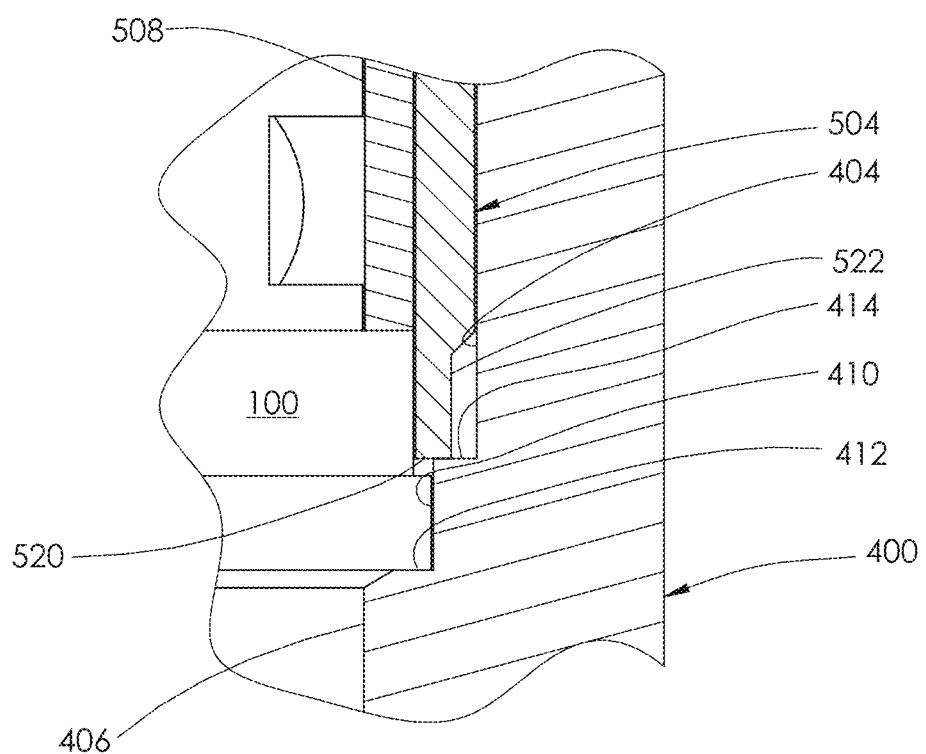
FIG. 4B depicts Detail-4B of FIG. 4A, in accordance with an embodiment.

The staking tool 500 is formed and configured in such a manner as to complete the installation method as disclosed herein by application of the staking tool 500 to both the bore 402 and the insert 100, and more particularly to the housing 300 of the insert 100, which has been inserted but not yet sealed or staked within the bore 402. While reference is made herein to a staking tool 500, it will be appreciated from the disclosure herein that said tool 500 serves as both an installation tool and a staking tool. As such, any reference herein to a staking tool may also be considered a reference to an installation and staking tool, for a purpose disclosed herein. The staking tool 500 is formed with a first, outer upper end 502 capable of having an external force F applied to the staking tool 500 at the first end 502, and a second, lower end 504 adapted to contact the installation bore 402 and the insert 100. The tool 500 is generally rotationally symmetrical about a central axis 530 between the first and second ends 502, 504. The tool 500, between the first and second ends 502, 504 comprises an outer cylindrical body 506 and an inner, insert engaging tool member 508, concentric with and smaller in diameter than the outertool body 506. In an embodiment the staking tool outer body 506 between the first and second ends 502, 504 comprises a section of radially enlarged diameter 510 forming a blind cavity 512, open at the tool second end 504 and closed by an end wall 514 toward the tool first end 502. Within the blind cavity 512, a resilient biasing member 600 is positioned between the cavity end wall 514 and the insert engaging member 508. As depicted in FIG. 4A, an embodiment of the biasing member 600 is formed by a column of multiple "Belleville" type conical spring washers (also known in the art as coned-disc springs, conical spring washers, disc springs, Belleville springs, or cupped spring washers), stacked in alternating opposing directions to form a partially resilient system of limited axial compressibility range. However, it will be appreciated that any resilient biasing member 600 suitable for a purpose disclosed herein, such as a compression spring or a resiliently compressible elastomer member, for example, may be employed, which are contemplated and considered to fall within the ambit of the invention disclosed herein. The inner tool member 508 comprises an upper, spring engaging end 516 of greater diameter as compared to a lower, cylindrical insert housing flange engaging end 518. The upper end 516 of the inner tool member 508 is sized to slidingly fit within the section of enlarged diameter 510 of the outer tool member 506 and to engage with the resilient biasing member 600. The lower portion of the inner tool member 508 is generally cylindrical, forming an inner central void 509, which is coaxial with the staking tool 500 in general and sufficiently large to accept the insert body 100, but not the component housing flange 304, without impacting the component body 300, and the lower flange engaging end 518 is engageable with the second, upper shoulder 308 of the component housing flange 304 before the lower end of the outer tool member 506 contacts the second upper bore shoulder 414 of the boss or manifold 400. The lower portion of the staking tool outer body 506 is sized to slidingly fit within the second, larger diameter bore section 408 of the boss or manifold 400, and the second, lower, end of the outer tool member 506 forms a rim 520 with an inside diameter less than the inside diameter of the intermediate bore section 410, so as to impact the second, upper bore shoulder 414 upon an installation procedure. The inside diameter of the tool outer member rim 520 is also less than the outside diameter of the first, lower upwardly facing shoulder 306 of the housing flange 304, and slightly greater than the outside diameter of the second, upwardly facing flange shoulder 308 of the housing flange 304. The radially outer edge of the tool outer body second end rim 520 is of reduced outside diameter, relative to the bore diameter 408, to form an inwardly tapered or inwardly offset outer edge 522. The axial separation of the downwardly facing flange shoulder 312 and the first, lower, upwardly facing flange shoulder 306 is slightly less than the axial separation of the first lower bore shoulder 412 and the second, upper bore shoulder 414. By incorporating an inwardly tapered or inwardly offset outer edge 522 at the rim 520 of the second lower end of the outer tool member 506, it has been found that the tool 500 may be successfully used to install an insert 100 into a bore 402 where the surrounding material of the boss or manifold 400 is of a thin-walled construction, without causing undesirable radial strain and expansion of the material of the thin-walled boss or manifold 400. Another benefit of the inwardly tapered or inwardly offset outer edge 522 at the rim 520 of the second lower end of the outer tool member 506 was found during automated feeding of the associated parts, which more smoothly entered and traveled down the bore 402. In an embodiment, the insert 100 may be slidingly held within the inner tool member 508 via a suction line (e.g., a vacuum line) coupled to the staking tool 500, which would facilitate horizontal or upward installations of the insert 100.

In an embodiment, an installation method as disclosed herein comprises the formation of the installation bore 402 as described herein with a first lower shoulder 412 and a second upper shoulder 414, an insert 100 comprising the combination of a desired system component 200 within a housing 300 constructed as described herein with an appropriately sized radially outwardly projecting flange 304 with an optional downward facing sealing ridge 314 and two upwardly facing shoulders 306, 308, the axial separation of the first and second bore shoulders 412, 414 being greater than the axial separation of the lower upward facing flange shoulder 306 from the downward facing flange shoulder 312, insertion of the housing 300 and the component 200 into the bore 402 to the point at which the optional downward ridge 314 of the housing flange 304, or the downward facing flange shoulder 312 of the housing flange 304, engages the first, lower, bore shoulder 412, formation of a staking tool 500 as described herein with concentric cylindrical members 506, 508, the inner tool member 508 spring biased in a downward direction, applying the staking tool 500 such that the inner tool member 508 engages the second, upper upwardly facing flange shoulder 308, and the outer tool end 520, 522 engages the second upper bore shoulder 414 and is driven toward the first lower flange upwardly facing shoulder 306, and applying sufficient downward force to the staking tool 500 to cause plastic flow of the inner edge of the second upper bore shoulder 414 downward and inward into the gap between the staking tool 500 and the component body flange upper shoulder 306, and plastic flow of the component body flange optional downward projecting ridge 314 and/or the material of the first upward facing bore shoulder 412. In this method the insert 100 is sealed twice, at the interface of the downward facing flange shoulder 312 and the lower bore shoulder 412, and at the interface of the flange upwardly facing shoulder 306 and the staked and deformed portion of the upper bore shoulder 414, and securely staked in place via the staked and deformed portion of the upper bore shoulder 414.

Figure 5:
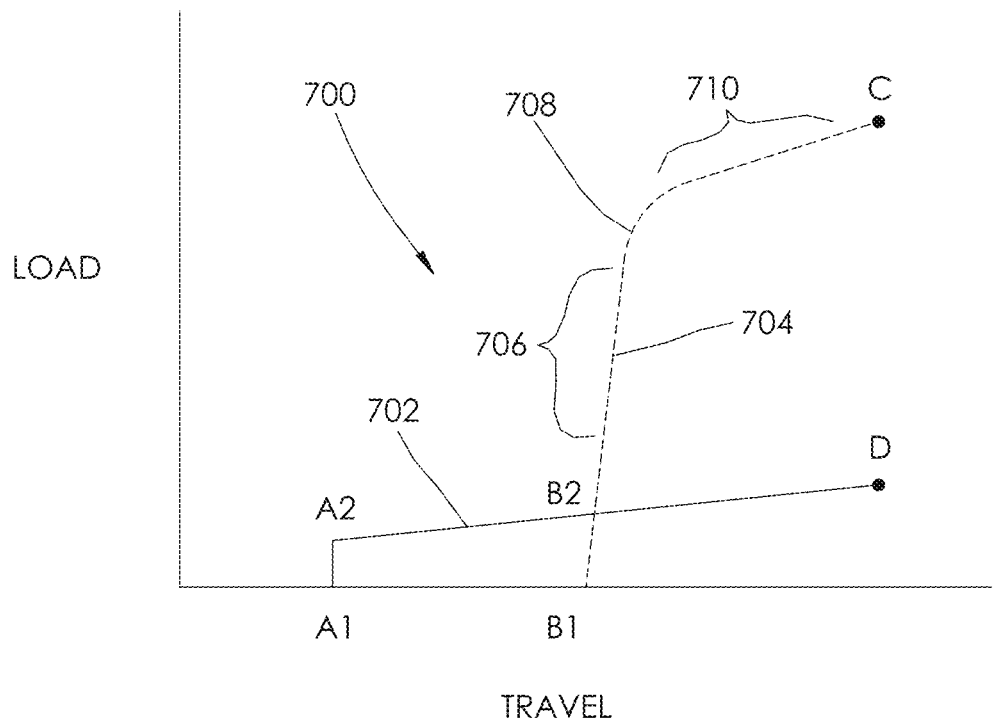
FIG. 5 depicts first and second load characteristics associated with the installation staking tool of FIG. 4A at point B2 in FIG. 5, as used with the installation method disclosed herein applied to the insert of FIG. 1A, in accordance with an embodiment.
Figure 6A:
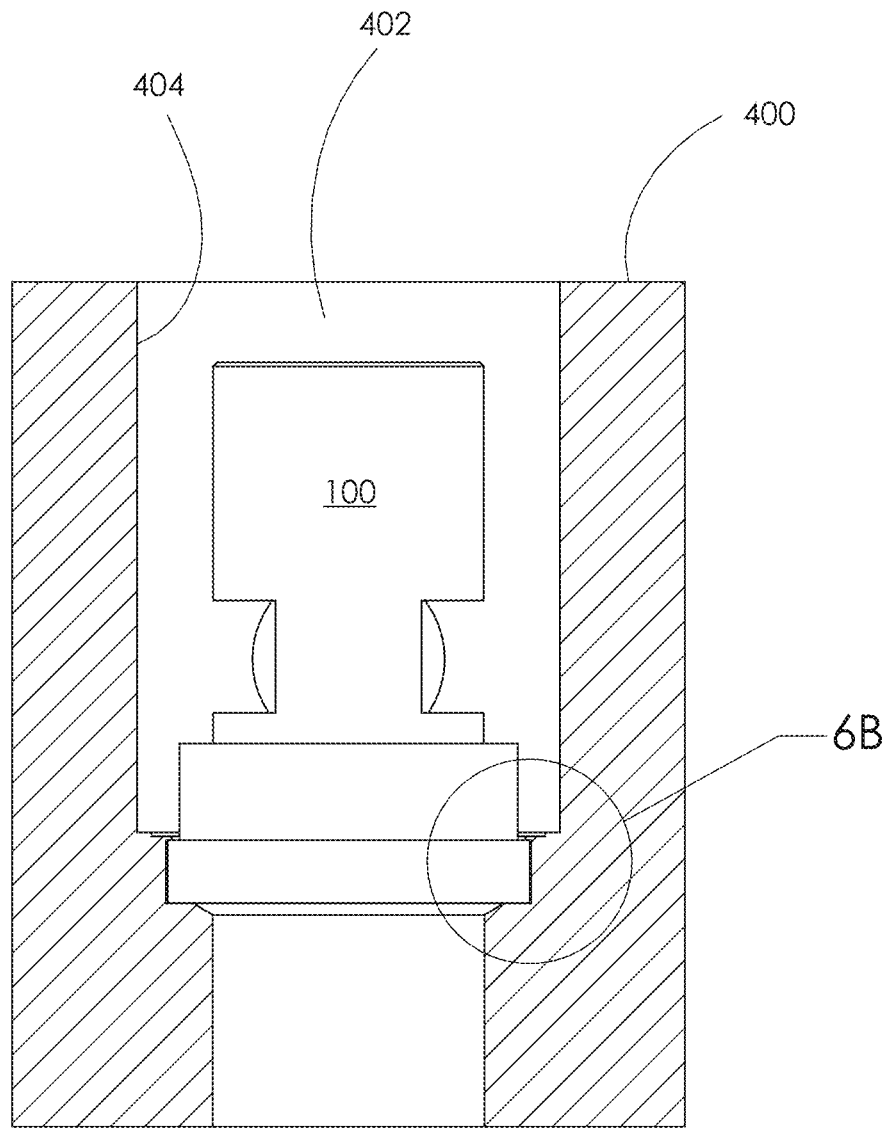
FIG. 6A depicts an embodiment similar to that of FIG. 3 but with the insert staked in the bore, in accordance with an embodiment.
Figure 6B:
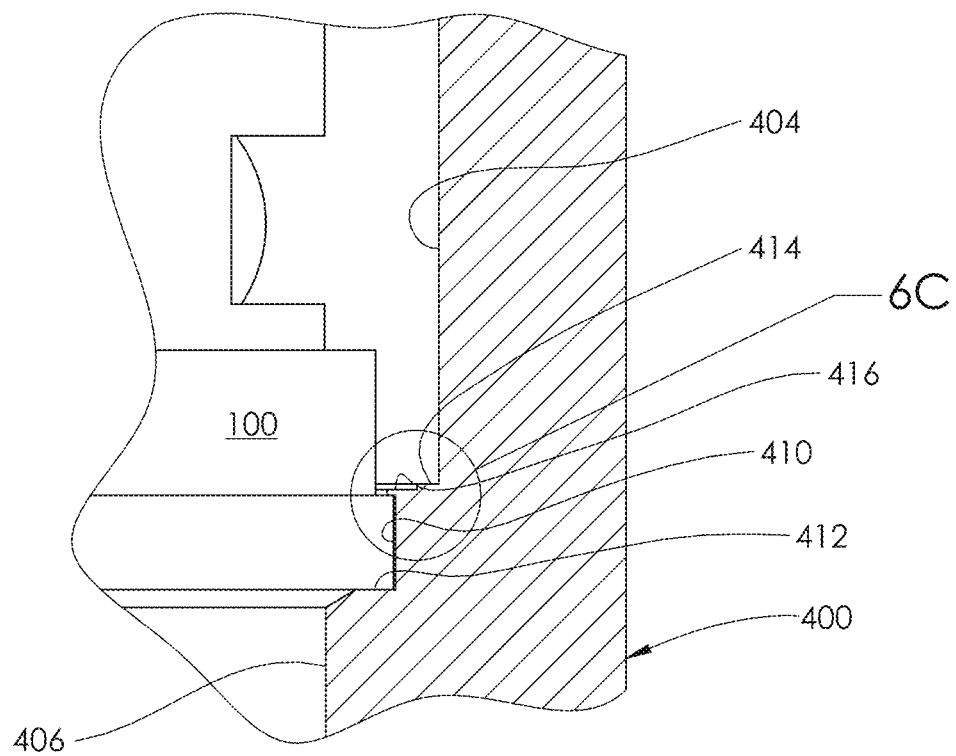
FIG. 6B depicts Detail-6B of FIG. 6A showing an example staked insert, in accordance with an embodiment.
Figure 6C:
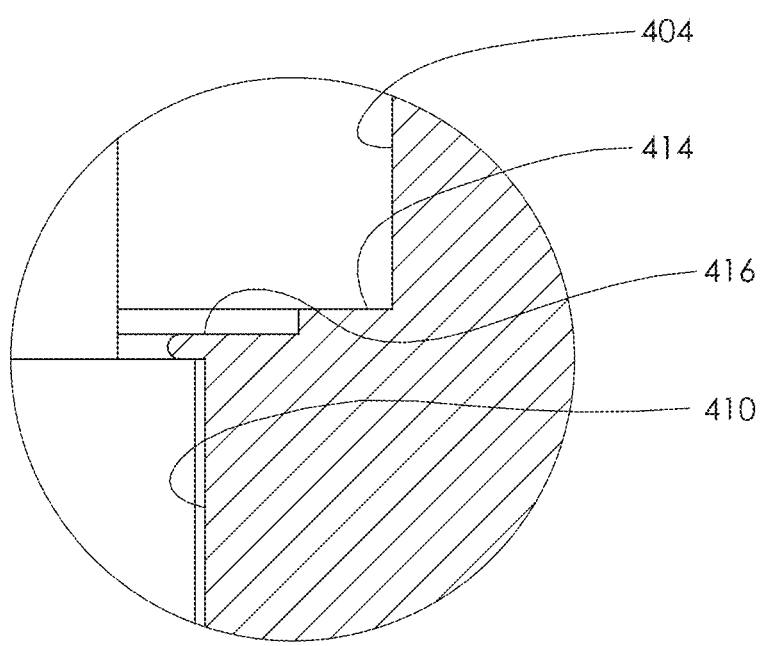
FIG. 6C depicts Detail-6C of FIG. 6B showing in more detail and example staked insert, in accordance with an embodiment.

Reference is now made to FIGS. 4-6 in combination, where FIG. 5 depicts a load versus axial travel characteristic 700 of the installation staking tool 500 as the force F (load) is applied to the staking tool 500 to install, seal, and stake in place, the insert 100 into the bore 402, and FIGS. 6A-6C depicts a finally staked and sealed insert 100 in the bore 402. In FIG. 5, two distinct load characteristic curves are depicted, a first load characteristic 702 that represents the spring rate of the resilient biasing member 600 (e.g., Belleville type conical spring washers), and a second load characteristic 704 that represents the elastic and plastic behavior of the material of the bore 402. When the staking tool 500 is first assembled and not yet engaged with the boss 400, the resilient biasing member 600 is in a preload relationship between end wall 514 and the upper spring engaging end 516 of the outer and inner tool members 506, 508, such that the gap 528 depicted in FIG. 4A is not yet present, and the downward facing flange shoulder 524 of the inner tool member 508 engages with the upward facing bore shoulder 526 of the outer tool member 506. Point A1 in FIG. 5 corresponds to an initial no-load condition where the staking tool 500 with the insert 100 disposed therein, and in contact at the upward facing shoulder 308, are positioned in impending contact with the bore 402. As the installation load increases, the internal preload of the resilient biasing member 600 has been reached, see point A2 in FIG. 5, and further deformation will follow the spring rate of the resilient biasing member 600 along the first load characteristic 702. As the loading further continues to increase to drive the insert 100 to a seated state where the downward facing shoulder 312 of flange 304 is seated on the upward facing lower bore shoulder 412, which is point B2 in FIG. 5 and the embodiment depicted in FIG. 4A (point B1 depicted in FIG. 5 represents an extrapolation of the second load characteristic 704 to a hypothetical point of travel absent the first load characteristic 702), the downward facing flange shoulder 524 of the inner tool member 508 lifts off the upward facing bore shoulder 526 of the blind cavity 512 to create a separation gap 528 therebetween. Also at point B2 in FIG. 5 and the embodiment depicted in FIG. 4A, the rim 520 of the lower end of the outer tool member 506 is seated on the upper bore shoulder 414. At this point B2, the staking process is initiated and the loading characteristic of the staking tool 500 becomes the combination of the first load characteristic 702 and the second load characteristic 704, where the first load characteristic 702 is applied to the insert 100, and the second load characteristic 704 is applied to the bore material of the upper bore shoulder 414. Following the second load characteristic 704 from point B2 to point C, the load F increases along the substantially vertical first portion 706 of the second load characteristic 704, which is representative of the general elastic behavior of the upper bore shoulder 414 and the outer tool member 506, until the knee 708 of the second load characteristic 704 is reached, which is representative of a transition from general elastic to general plastic behavior of the malleable upper bore shoulder 414 as it deforms to stake the insert 100 in place as the load F continues along second portion 710 of the second load characteristic 704. The yielding of the malleable upper bore shoulder 414 is generally linear, follows characteristic portion 710, and continues to point C where the desired installation loading is achieved, the installation process is stopped, and the insert 100 is securely staked in place via plastically deformed material 416 of the malleable upper bore shoulder 414 (see FIGS. 6B-6C, for example). Now following the first load characteristic 702 from point B2 to point D, as the outer tool member 506 moves downward in the staking process, the inner tool member 508 remains holding the insert 100 as the load increases from point B2 to point D under the influence of the spring rate of the resilient biasing member 600, resulting in a final sealing load between the downward facing shoulder 312 of flange 304 and the upward facing lower bore shoulder 412 at point D. At point D, the clamping load on the inner tool member 508 has increased due to the spring rate of the resilient biasing member 600, which results in the gap 528 increasing from the condition depicted in FIG. 4A. It is contemplated that different inserts 100 with different fluid components 200 disposed therein for installation into a bore 402 of different materials, may require different installation load characteristics. As such, the load characteristic 700 depicted in FIG.

5 is considered to be representative of any and all load characteristics consistent with an embodiment disclosed herein. By incorporating two distinct load characteristic curves 702, 704 into the installation staking tool 500, it has been found that not only may the tool 500 be adapted for different inserts 100 and different materials of the bore 402, but also separates the staking force from the sealing force to prevent undesirable distortion of the seat upon which the insert 100 is sealed against, and to further prevent undesirable radial strain and expansion of the material of what may be a thin-walled boss or manifold 400.

From the foregoing, it will be appreciated that the first load characteristic 702 depicted in FIG. 5 represents only the spring rate of the resilient biasing member 600, and is therefore representative of general elastic behavior, which one skilled in the art would appreciate does not include plastic deformation that would come into play with use of the optional annular downwardly projecting sealing ridge 314. One skilled in the art would further appreciate how the first load characteristic 702 could be modified to include both general elastic behavior, relating to the spring rate of the resilient biasing member 600, and general plastic behavior, relating to deformation of the optional annular downwardly projecting sealing ridge 314, or deformation of the lower bore shoulder 412, when the sealing ridge 314 is used, and depending on the selection of materials as discussed herein above. It will also be appreciated that while only two load characteristics 702, 704 are depicted and described, the scope of the invention is not so limited as it is contemplated that other loads may employed to provide a staking tool having multiple load characteristics.

Figure 7:
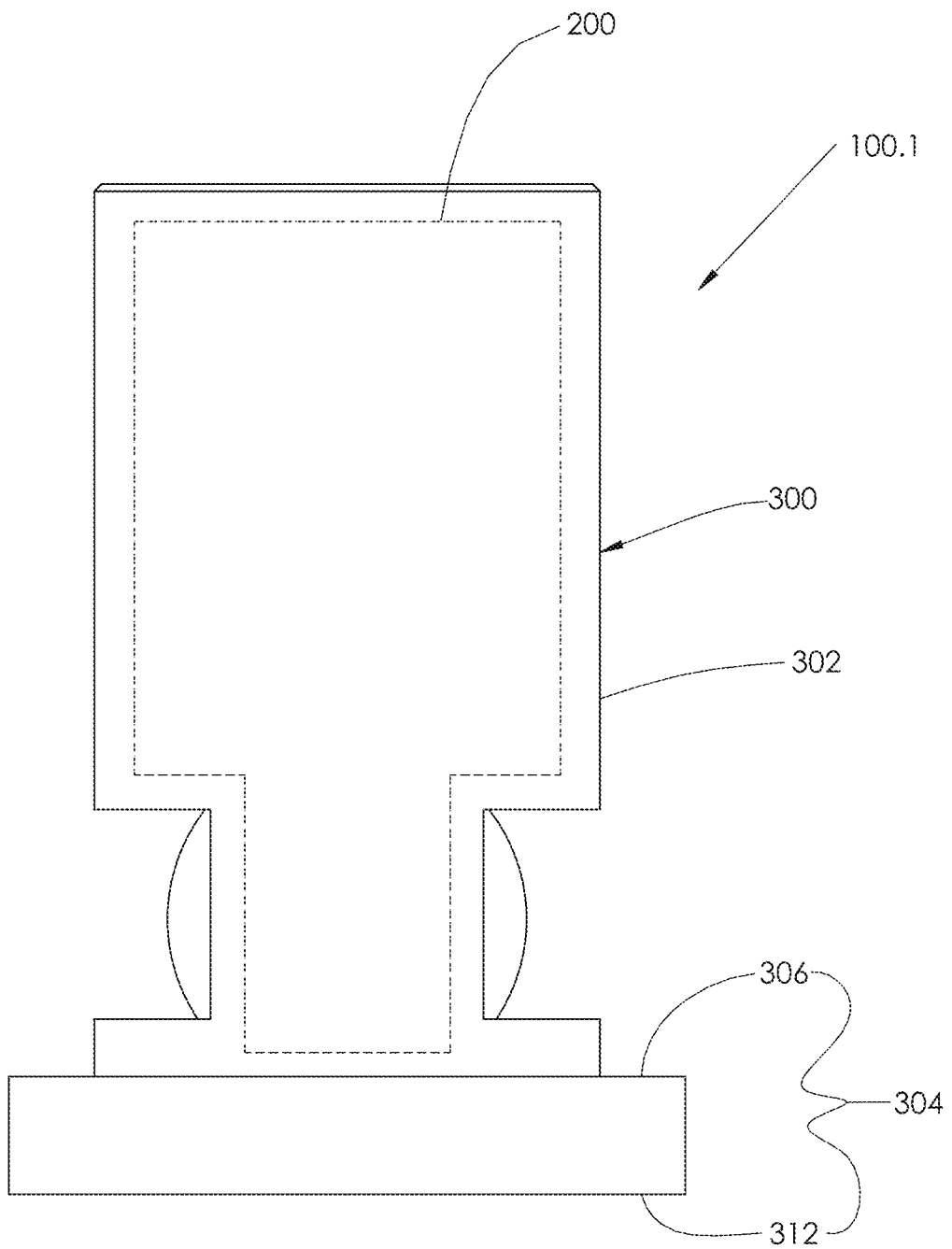
FIG. 7 depicts a side view of an alternative insert similar to that of FIG. 1A, in accordance with an embodiment.
Figure 8:
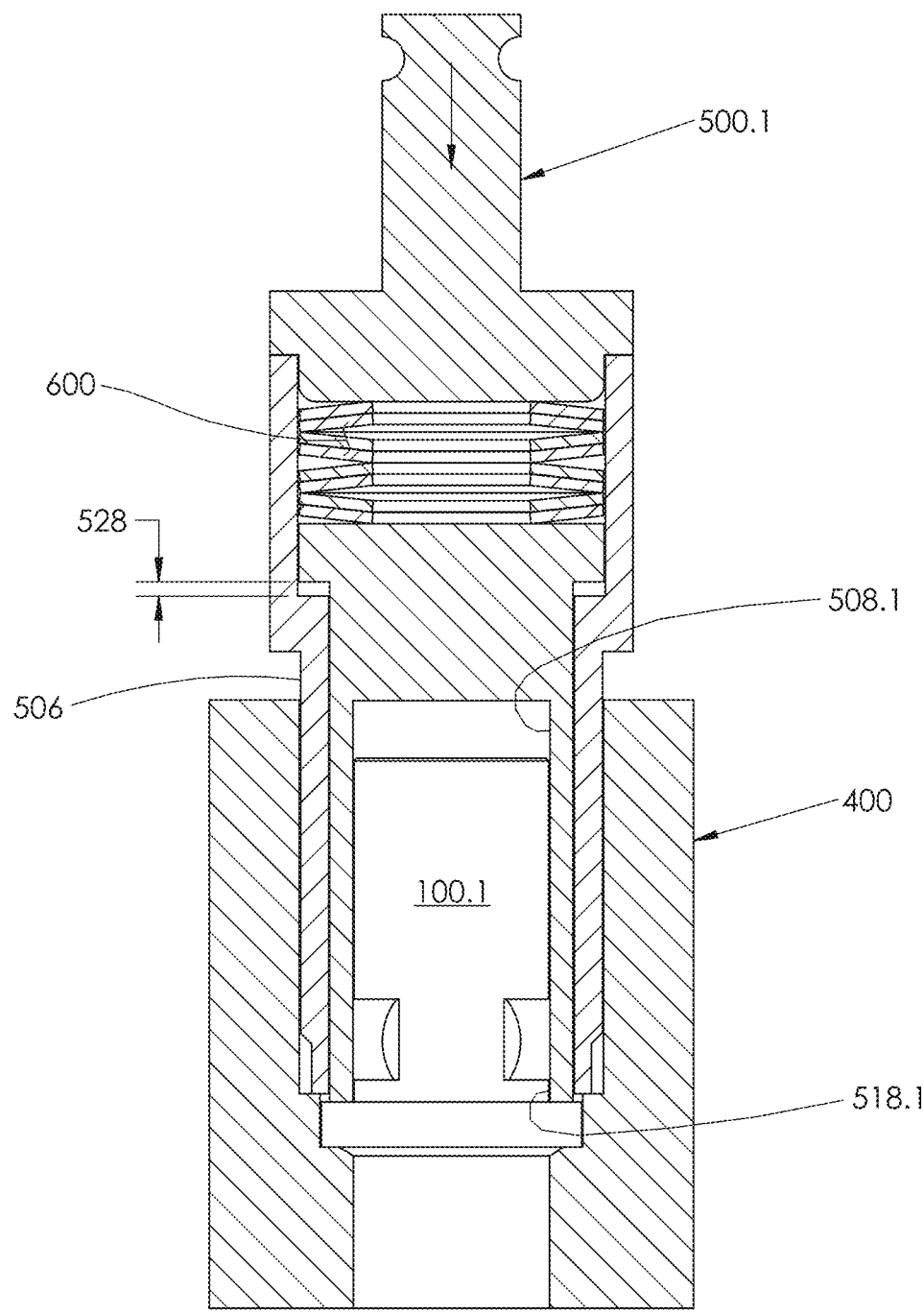
FIG. 8 depicts a side view of the insert of FIG. 7 partially inserted into but not staked in an installation bore according to a method in accordance with an embodiment, with a cross sectional view of an alternative staking tool similar to that of FIG. 4A and formed in accordance with an embodiment.
Figure 9:
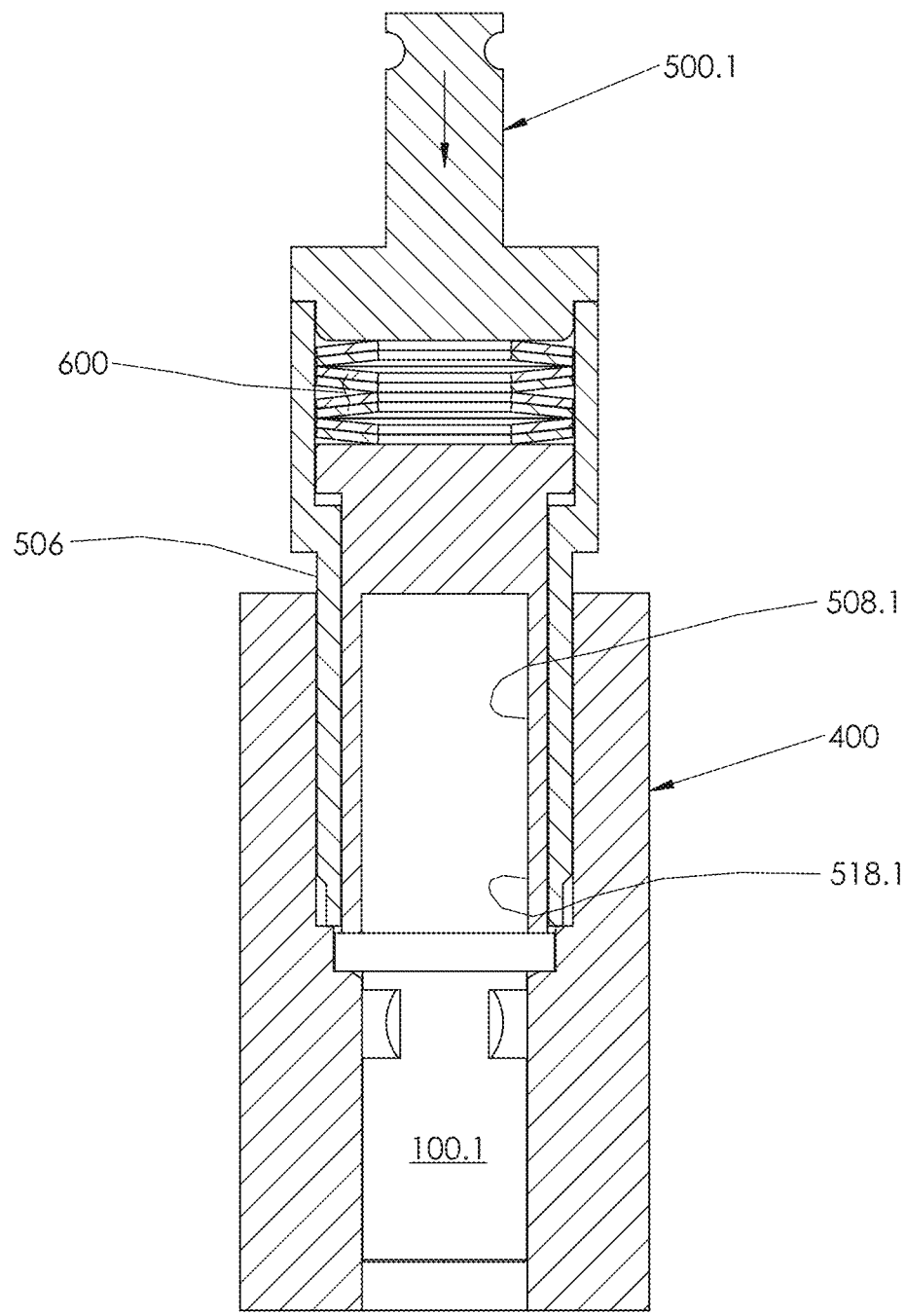
FIG. 9 depicts the insert of FIG. 7 and the staking tool of FIG. 8 with the insert in a reverse-install arrangement, in accordance with an embodiment.

Reference is now made to FIGS. 7-9, which depict similar but alternative arrangements to the staking tool 500 and insert 100 described herein above. FIG. 7 depicts an insert 100.1 similar to the insert 100 of FIG. 1A, but absent the upward facing shoulder 308 of the flange 304, where other like features are numbered alike. FIG. 8 depicts a staking tool 500.1 similar to the staking tool 500 of FIG. 4A, but configured to accommodate the insert 100.1 of FIG. 7, where the lower flange engaging end 518.1 of the inner tool member 508.1 of staking tool 500.1 is extended longer than the lower flange engaging end 518 of the inner tool member 508 of staking tool 500 so as to engage with the upwardly facing shoulder 306 of flange 304 of insert 100.1. Other features and installation procedures of staking tool 500.1 are similar to that described above in connection with staking tool 500. FIG. 9 depicts the staking tool 500.1 and insert 100.1, with the insert 100.1 disposed in a reverse-install arrangement in the boss or manifold 400. As such, it will be appreciated that an embodiment as disclosed herein includes a staking tool configured for installing and staking an insert into a boss or manifold in either a forward-install arrangement (see FIGS. 4 and 8) or a reverse-install arrangement (see FIG. 9).

In view of all of the foregoing, it will be appreciated that an embodiment of the invention includes the following embodiments:

Embodiment 1

An installation tool for installing an insert into a bore comprising a bore material, the insert comprising a fluid component disposed within a housing, the installation tool comprising: an outer tool member and an inner tool member, the inner tool member being concentric with, smaller in diameter than, and slidingly engaged within the outer tool member, the inner tool member being configured to axially drive the insert into the bore; wherein an upper end of the outer tool member forms and defines a blind cavity between the inner tool member at one end of the blind cavity and a cavity end wall at an opposing end of the blind cavity; wherein a resilient biasing member is disposed within the blind cavity, the resilient biasing member being configured to provide an axial load on the inner tool member.

Embodiment 2

The tool of Embodiment 1, wherein: a lower end of the inner tool member is configured to engage an upward facing upper shoulder of a flange of the insert housing; a lower end of the outer tool member is configured to engage an upward facing upper bore shoulder of the bore; and the lower end of the inner tool member is disposed within the outer tool member at a defined distance from the lower end of the outer tool member.

Embodiment 3

The tool of any of Embodiments 1-2, wherein: the resilient biasing member comprises: a plurality of Belleville type conical spring washers; a compression spring; a resiliently compressible elastomer member; or, any combination of the foregoing.

Embodiment 4

The tool of any of Embodiments 1-3, wherein: the inner tool member, the outer tool member, and the resilient biasing member, are configured to generate a combined load characteristic comprising a first load characteristic and a second load characteristic, the first load characteristic being configured to be applied primarily to the insert, and the second load characteristic being configured to be applied primarily to the bore.

Embodiment 5

The tool of Embodiment 4, wherein: the first load characteristic is configured to be applied primarily to the insert independent of the second load characteristic being configured to be applied primarily to the bore.

Embodiment 6

The tool of any of Embodiments 4-5, wherein: the first load characteristic is defined by a force of the resilient biasing member being applied to the inner tool member; and the second load characteristic is defined by an externally applied axial force being applied to the outer tool member.

Embodiment 7

The tool of any of Embodiments 4-6, wherein the tool is configured to have a first distance of travel, and a second distance of travel subsequent to the first distance of travel, during an installation process as applied to the insert, and further wherein: the first load characteristic is configured to be operational in the first distance of travel absent a presence of the second load characteristic; and the first load characteristic is configured to be operational in the second distance of travel coincidental with a presence of the second load characteristic

Embodiment 8

The tool of any of Embodiments 4-7, wherein: the second load characteristic is productive of a load that is greater than the first load characteristic.

Embodiment 9

The tool of any of Embodiments 4-8, wherein: the first load characteristic is representative of elastic deformation; and the second load characteristic is representative of both elastic and plastic deformation.

Embodiment 10

The tool of Embodiment 9, wherein: the representative elastic deformation of the first load characteristic corresponds with a spring rate of the resilient biasing member; and the representative elastic and plastic deformation of the second load characteristic corresponds with elastic and plastic material characteristics of the bore material.

Embodiment 11

The tool of Embodiment 10, wherein: the elastic material characteristics of the bore material is defined by a first substantially vertical portion of the second load characteristic; the plastic material characteristic of the bore material is defined by a second generally linear but not vertical portion of the second load characteristic; and a transition from the first portion of the second load characteristic to the second portion of the second load characteristic is marked by a knee in the second load characteristic.

Embodiment 12

The tool of any of Embodiments 7-11, wherein: the tool is configured to produce a final sealing load between a downward facing lower shoulder of the flange of the insert housing and an upward facing lower bore shoulder of the bore that increases during both the first distance of travel and the second distance of travel of the first load characteristic.

Embodiment 13

The tool of any of Embodiments 2-12, wherein: the lower end of the outer tool member comprises a radially outer edge that is inwardly tapered or offset with an outside diameter that is less than an inside diameter of a sideways adjacent upper bore section of the bore.

Embodiment 14

The tool of any of Embodiments 1-13, wherein the inner tool member is further configured to hold the insert via suction.

Embodiment 15

The tool of any of Embodiments 1-14, wherein the insert is installable into the bore in either a forward-install arrangement or a reverse-install arrangement.

Embodiment 16

A method of installing an insert into a bore comprising a bore material, the insert comprising a fluid component disposed within a housing, the method comprising: providing a boss or manifold comprising the bore; providing an installation tool with the insert disposed at a lower end of the installation tool, the installation tool comprising: an outer tool member and an inner tool member, the inner tool member being concentric with, smaller in diameter than, and slidingly engaged within the outer tool member, the inner tool member being configured to axially drive the insert into the bore; wherein the outer tool member forms and defines a blind cavity between the inner tool member at one end of the blind cavity and a cavity end wall at an opposing end of the blind cavity; wherein a resilient biasing member is disposed within the blind cavity, the resilient biasing member being configured to provide an axial load on the inner tool member; inserting the installation tool and insert into the bore with an axial force that follows a first load characteristic until the insert is first seated on a shoulder of the bore; further inserting the installation tool into the bore with an axial force that follows a second load characteristic that is greater than the first load characteristic, the further inserting being stopped in response to a defined force having been achieved wherein deformation of the bore material has occurred over a portion of the insert resulting in securely staking of the insert in the bore.

Embodiment 17

The method of Embodiment 16, wherein: the further inserting results in a final sealing load between the insert and the shoulder of the bore that increases subsequent to the insert having been first seated on the shoulder of the bore.

Embodiment 18

The method of any of Embodiments 16-17, wherein: the first load characteristic is representative of elastic deformation of the resilient biasing member; and the second load characteristic is representative of both elastic and plastic deformation of the bore material.

Embodiment 19

The method of any of Embodiments 16-17, wherein: the first load characteristic is representative of elastic deformation of the resilient biasing member, and of plastic deformation of either the insert or the bore material or both; and the second load characteristic is representative of both elastic and plastic deformation of the bore material.

Embodiment 20

The method of any of Embodiments 16-18, wherein: the first load characteristic is applied primarily to the insert; and the second load characteristic is applied primarily to the bore.

Embodiment 21

The method of any of Embodiments 16-20, wherein: the tool undergoes a first distance of travel, and a second distance of travel subsequent to the first distance of travel; the first load characteristic is operational during the first distance of travel absent a presence of the second load characteristic; and the first load characteristic is operational during the second distance of travel coincidental with a presence of the second load characteristic.

Embodiment 22

The method of any of Embodiments 16-21, wherein: the inner tool member is responsive to the first load characteristic to first seat the insert on the shoulder of the bore; the outer tool member is responsive to both the first load characteristic and the second load characteristic to facilitate plastic deformation of the bore material to securely stake the insert in the bore; and the inner tool member is further responsive to both the first load characteristic and the second load characteristic to seal the insert with respect to the shoulder of the bore.

Embodiment 23

The method of any of Embodiments 16-22, wherein: a lower end of the outer tool member comprises a radially outer edge that is inwardly tapered or offset with an outside diameter that is less than an inside diameter of a sideways adjacent portion of the bore that results in the bore material being more inwardly deformed than outwardly deformed upon securely staking the insert in the bore.

Embodiment 24

The method of any of Embodiments 16-23, wherein the insert is installed and staked in the bore in a forward-install arrangement.

Embodiment 25

The method of any of Embodiments 16-23, wherein the insert is installed and staked in the bore in a reverse-install arrangement.

While an invention has been described herein with reference to example embodiments, it will be understood by those skilled in the art that various changes may be made and equivalents may be substituted for elements thereof without departing from the scope of the claims. Many modifications may be made to adapt a particular situation or material to the teachings of the invention without departing from the essential scope thereof. Therefore, it is intended that the invention not be limited to the particular embodiment or embodiments disclosed herein as the best or only mode contemplated for carrying out this invention, but that the invention will include all embodiments falling within the scope of the appended claims. In the drawings and the description, there have been disclosed example embodiments and, although specific terms and/or dimensions may have been employed, they are unless otherwise stated used in a generic, exemplary and/or descriptive sense only and not for purposes of limitation, the scope of the claims therefore not being so limited. When an element such as a layer, film, region, substrate, or other described feature is referred to as being "on" another element, it can be directly on the other element, or intervening elements may also be present. In contrast, when an element is referred to as being "directly on" another element, there are no intervening elements present. The use of the terms first, second, etc. do not denote any order or importance, but rather the terms first, second, etc. are used to distinguish one element from another. The use of the terms a, an, etc. do not denote a limitation of quantity, but rather denote the presence of at least one of the referenced item. The term "comprising" as used herein does not exclude the possible inclusion of one or more additional features. And, any background information provided herein is provided to reveal information believed by the applicant to be of possible relevance to the invention disclosed herein. No admission is necessarily intended, nor should be construed, that any of such background information constitutes prior art against an embodiment of the invention disclosed

What is claimed is:

1. An installation tool for installing an insert into a bore comprising a bore material and a bore shoulder, the insert comprising a fluid component disposed within a housing, the installation tool comprising:
   an outer tool member and an inner tool member, the inner tool member being concentric with, smaller in diameter than, and slidingly engaged within the outer tool member, the inner tool member being configured to axially drive the insert into the bore;
   wherein an upper end of the outer tool member forms and defines a blind cavity between the inner tool member at one end of the blind cavity and a cavity end wall at an opposing end of the blind cavity;
   wherein a lower end of the outer tool member comprises a rim with an inside diameter less than an inside diameter of the bore, wherein the rim is configured to impact the bore shoulder of the bore upon an installation procedure;
   wherein a resilient biasing member is disposed within the blind cavity, the resilient biasing member being configured to provide an axial load on the inner tool member;
   wherein a lower portion of the inner tool member comprises an inner central void that is coaxial with the installation tool and is sized to receive the insert;
   wherein the resilient biasing member biases the inner tool member toward the outer tool member until a downward facing flange shoulder of the inner tool member engages with an upward facing bore shoulder of the outer tool member, wherein upon engagement of the downward facing flange shoulder with the upward facing bore shoulder the resilient biasing member is in a preload relationship between the outer tool member and the inner tool member.

2. The tool of claim 1, wherein:
   a lower end of the inner tool member is configured to engage an upward facing upper shoulder of a flange of the insert housing;
   a lower end of the outer tool member is configured to engage an upward facing upper bore shoulder of the bore; and
   the lower end of the inner tool member is disposed within the outer tool member at a defined distance from the lower end of the outer tool member.

3. The tool of claim 2, wherein:
   the resilient biasing member comprises: a plurality of Belleville type conical spring washers; a compression spring; a resiliently compressible elastomer member; or, any combination of the foregoing.

4. The tool of claim 3, wherein:
   the inner tool member, the outer tool member, and the resilient biasing member, are configured to generate a combined load characteristic comprising a first load characteristic and a second load characteristic, the first load characteristic being configured to be applied primarily to the insert, and the second load characteristic being configured to be applied primarily to the bore.

5. The tool of claim 4, wherein:
   the first load characteristic is configured to be applied primarily to the insert independent of the second load characteristic being configured to be applied primarily to the bore.

6. The tool of claim 5, wherein:
the first load characteristic is defined by a force of the resilient biasing member being applied to the inner tool member; and
the second load characteristic is defined by an externally applied axial force being applied to the outer tool member.

7. The tool of claim 6, wherein the tool is configured to have a first distance of travel, and a second distance of travel subsequent to the first distance of travel, during an installation process as applied to the insert, and further wherein:
the first load characteristic is configured to be operational in the first distance of travel absent a presence of the second load characteristic; and
the first load characteristic is configured to be operational in the second distance of travel coincidental with a presence of the second load characteristic.

8. The tool of claim 7, wherein:
the second load characteristic is productive of a load that is greater than the first load characteristic.

9. A combination comprising the tool of claim 8, the insert, and the bore, wherein:
the housing of the insert comprises a flange shoulder; and
the bore further comprises a bore shoulder;
the first load characteristic is representative of elastic deformation of the resilient biasing member; and
the second load characteristic is representative of both elastic and plastic deformation of the bore shoulder of the bore, the flange shoulder of the insert, or both the bore shoulder of the bore and the flange shoulder of the insert.

10. The combination of claim 9, wherein:
the representative elastic deformation of the first load characteristic corresponds with a spring rate of the resilient biasing member; and
the representative elastic and plastic deformation of the second load characteristic corresponds with elastic and plastic material characteristics of the bore material.

11. The combination of claim 10, wherein:
the elastic material characteristics of the bore material is defined by a first substantially vertical portion of the second load characteristic;
the plastic material characteristic of the bore material is defined by a second generally linear but not vertical portion of the second load characteristic; and
a transition from the first portion of the second load characteristic to the second portion of the second load characteristic is marked by a knee in the second load characteristic.

12. The combination of claim 11, wherein:
the tool is configured to produce a final sealing load between a downward facing lower shoulder of the flange of the insert housing and an upward facing lower bore shoulder of the bore that increases during both the first distance of travel and the second distance of travel of the first load characteristic.

13. The combination of claim 12, wherein:
the lower end of the outer tool member comprises a radially outer edge that is inwardly tapered or offset with an outside diameter that is less than an inside diameter of a sideways adjacent upper bore section of the bore.

14. The tool of claim 1, wherein the inner and outer tool members are configured such that the insert is installable into the bore in either a forward-install arrangement, where the insert is positionable within the inner central void, or a reverse-install arrangement, where the insert is not positionable within the inner central void.

15. A method of installing an insert into a bore comprising a bore material, the insert comprising a fluid component disposed within a housing, the method comprising:
providing a boss or manifold comprising the bore, the bore comprising a bore shoulder;
providing an installation tool with the insert disposed at a lower end of the installation tool, the installation tool comprising:
an outer tool member and an inner tool member, the inner tool member being concentric with, smaller in diameter than, and slidingly engaged within the outer tool member, the inner tool member being configured to axially drive the insert into the bore;
wherein a lower end of the outer tool member comprises a rim with an inside diameter less than an inside diameter of the bore, wherein the rim is configured to seat on the bore shoulder of the bore;
wherein the outer tool member forms and defines a blind cavity between the inner tool member at one end of the blind cavity and a cavity end wall at an opposing end of the blind cavity;
wherein a resilient biasing member is disposed within the blind cavity, the resilient biasing member being configured to provide an axial load on the inner tool member;
inserting the installation tool and insert into the bore with an axial force that follows a first load characteristic, wherein a downward facing flange shoulder of the inner tool member is engaged with an upward facing bore shoulder of the outer tool member, until the insert is first seated on the bore shoulder of the bore;
further inserting the installation tool into the bore with an axial force that follows a second load characteristic that is greater than the first load characteristic, wherein the downward facing flange shoulder of the inner tool member is disengaged with the upward facing bore shoulder of the outer tool member, the further inserting being stopped in response to a defined force having been achieved wherein deformation of the bore material has occurred over a portion of the insert resulting in securely staking of the insert in the bore.

16. The method of claim 15, wherein:
the further inserting results in a final sealing load between the insert and the shoulder of the bore that increases subsequent to the insert having been first seated on the shoulder of the bore.

17. The method of claim 16, wherein:
the first load characteristic is representative of elastic deformation of the resilient biasing member; and
the second load characteristic is representative of both elastic and plastic deformation of the bore material.

18. The method of claim 16, wherein:
the first load characteristic is representative of elastic deformation of the resilient biasing member, and of plastic deformation of either the insert or the bore material or both; and
the second load characteristic is representative of both elastic and plastic deformation of the bore material.

19. The method of claim 17, wherein:
the first load characteristic is applied primarily to the insert; and
the second load characteristic is applied primarily to the bore.

20. The method of claim 19, wherein:
the tool undergoes a first distance of travel, and a second distance of travel subsequent to the first distance of travel;
the first load characteristic is operational during the first distance of travel absent a presence of the second load characteristic; and
the first load characteristic is operational during the second distance of travel coincidental with a presence of the second load characteristic.

21. The method of claim 20, wherein:
the inner tool member is responsive to the first load characteristic to first seat the insert on the shoulder of the bore;
the outer tool member is responsive to both the first load characteristic and the second load characteristic to facilitate plastic deformation of the bore material to securely stake the insert in the bore; and
the inner tool member is further responsive to both the first load characteristic and the second load characteristic to seal the insert with respect to the shoulder of the bore.

22. The method of claim 21, wherein:
a lower end of the outer tool member comprises a radially outer edge that is inwardly tapered or offset with an outside diameter that is less than an inside diameter of a sideways adjacent portion of the bore that results in the bore material being more inwardly deformed than outwardly deformed upon securely staking the insert in the bore.

23. The method of claim 22, wherein the insert is installed and staked in the bore in a forward-install arrangement.

24. The method of claim 22, wherein the insert is installed and staked in the bore in a reverse-install arrangement.

* * * * *